March 25, 1952  A. C. SICILIANO  2,590,797
LOW-PRESSURE DROP FLUID DUCT BEND
Filed Feb. 3, 1950

Inventor:
Anthony C. Siciliano,
by Ernest H. Britton
His Attorney.

Patented Mar. 25, 1952

2,590,797

UNITED STATES PATENT OFFICE 2,590,797

LOW-PRESSURE DROP FLUID DUCT BEND

Anthony C. Siciliano, Wesleyville, Pa., assignor to General Electric Company, a corporation of New York Application February 3, 1950, Serial No. 142,185

5 Claims. (Cl. 138—39)

My invention relates to bend sections in fluid conveying ducts and more particularly to the construction of a fluid conveying duct section wherein a change in the direction of fluid flow is accomplished with a minimum of loss of pressure of the fluid.

This invention primarily involves elbows or bend sections in rectangular cross-section fluid conveying ducts such as those commonly used for conveying air in heating and ventilating systems or in conveying combustion air in power plants, but may be found useful in ducts for the conveyance of other fluids for other purposes. In sheet metal duct work of the type under consideration, the simplest, cheapest and most obvious bend construction comprises a square corner bend with no curvature in the duct surfaces whatever. It has been found that in order to obtain a more efficient duct bend, that is, one in which a lower pressure drop occurs at the bend due to turbulence in the fluid, that the duct bend may be altered by substituting radiused surfaces for the square corner bends. However, a radiused bend is more expensive and complicated to manufacture than a straight bend and when the inner corner of the bend is radiused, the duct requires more space since, in effect the inner corner of the bend has been filled in.

It is, therefore, an object of my invention to provide an improved fluid duct having essentially the economical square corner bend construction but with simple added elements to reduce the pressure drop therein.

My invention, therefore, consists essentially in an improved bend construction for fluid conveying ducts of rectangular cross section wherein the efficiency of the bend is improved by the addition of curved surfaces in the bend, the radii of curvature having a definite relationship to a dimension of the duct.

Figure 1:
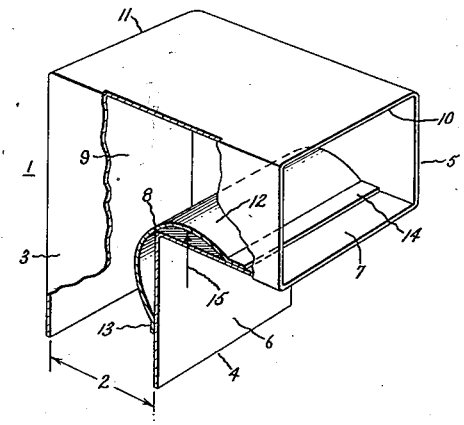
Figure 2:
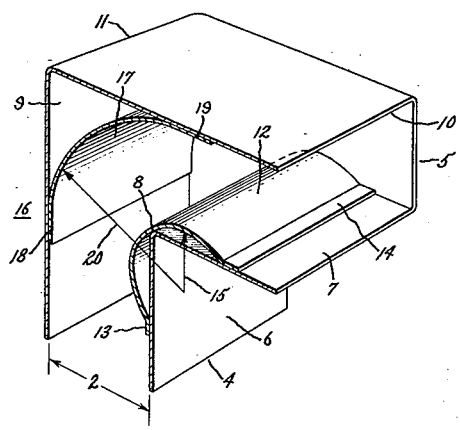
Figure 3:
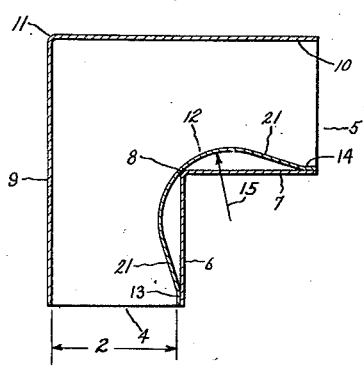

For a better and more complete understanding of this invention, reference may be had to the following specification and the accompanying drawing wherein Figs. 1 and 2 are perspective views, with cut away sections, of two embodiments of my invention, and Fig. 3 is a side view, in section, showing an alternative detail of construction which may be used in the embodiments of either Fig. 1 or Fig. 2, and the features of novelty are set forth in the appended claims.

Referring now particularly to the drawing, Fig. 1, there is shown a fluid duct bend section 1 for a rectangular cross-section fluid conveying duct. The duct has a width dimension 2 at the duct surface 3. The ends 4 and 5 of section 1 are open and adapted to be joined with additional duct sections to form a complete fluid conveying duct structure. The duct bend includes inner duct surfaces 6 and 7 which meet at an inner right angle bend or corner 8, and outer duct surfaces 9 and 10 which meet at an outer right angle bend or corner 11. An additional curved surface 12, which may comprise a separate piece of sheet metal, is added to the inner corner 8 of the bend in the interior of the duct. Surface 12 is fastened in place at the ends 13 and 14 by a suitable method such as welding or riveting. Surface 12 is preferably bent in a circular curve through an angle of 180° and having a diameter of curvature which is approximately equal to the width dimension 2. The radius of curvature 15 is, therefore, approximately one-half of the width dimension 2. More exactly, the ideal radius of curvature 15 is 0.466 times the width dimension 2.

It has been found that with this configuration of duct bend, the loss of pressure at the bend, of the fluids being conveyed can be reduced as much as 55%. Any substantial increase or decrease of radius 15 from the value stated above results in a loss of efficiency in terms of an increased pressure loss. However, the radius of curvature 15 can be varied over a range from one-quarter of the width dimension 2 to the full width dimension 2 without departing from the spirit of this invention, effecting a substantial reduction in the loss of fluid pressure at the bend.

In Fig. 2, there is shown a second embodiment of my invention, designated as a whole as 16, wherein a second curved surface 17 is incorporated in the interior of the duct at the outer corner 11 of the duct bend, and welded or riveted in place at the ends 18 and 19 in a known manner. Surface 17 also has a circular curvature, but of a radius 20 equal to one and one-third times the duct width dimension 2. Again a substantially greater or lesser radius of curvature will reduce the efficiency of the duct bend, but this radius of curvature can also be varied over a range from one and one-sixth times, to one and three-quarters times the duct width dimension 2 without departing from the spirit of this invention, effecting a substantial reduction in the loss of fluid pressure at the bend. With the addition of both curved surfaces 12 and 17, the reduction of the pressure drop in the duct bend can be as much as 65%.

Since the ideal radius of curvature 15 of surface 12 is 0.446 times the width dimension 2 and since the ideal radius of curvature 20 of surface 17 is equal to one and one-third times the duct width dimension 2, the ideal ratio between these radii is 0.466 divided by one and one-third which equals 0.35.

The transitions, at ends 13 and 14, from the curved surface 12 to the flat surfaces 6 and 7 need not be as abrupt as shown. As illustrated in Fig. 3, for instance, surface 12 may include flat surfaces 21, tangent to the curve of surface 12.

It will be seen from the above that I have provided for a duct bend having a maximum efficiency while maintaining the economy and simplicity of construction of a square duct bend as well as the space saving properties thereof. In this connection, it is obvious that inner duct surfaces 6 and 7 may be concurrently positioned against perpendicular surfaces which meet to form an angled corner or edge. This edge then fits into the inner corner 8 of the duct. These surfaces may define the exterior of a structural member, the edge of which cannot be radiused to provide space for a conventional inner curved duct bend.

It will be understood, of course, that although the above description has been entirely on the basis of 90° bends, that the invention may also be advantageously applied to bends of other angles. Various other modifications may be made without departing from the invention. The appended claims are, therefore, intended to cover any such modifications within the true spirit and scope of the invention.

What I claim as new and desire to secure by Letters Patent of the United States is:

1. An elbow for a rectangular cross section fluid duct having an angled bend at the inner corner on the exterior surface of said elbow, the interior surface of said elbow at said corner being curved and having a minimum radius of curvature in the direction of the bend of said elbow not greater than the width of said duct but not less than one quarter of said width, the angle of the arc of said curvature being greater than the angle of said elbow.

2. An elbow for a rectangular cross section fluid duct having an angled bend at the inner corner of the exterior of said elbow, the interior of said elbow having curved surfaces at both said inner bend and at the outer corner thereof, said first mentioned curved surface having an angle of curvature greater than the angle of said elbow and a minimum radius of curvature in the direction of the bend of said elbow not greater than the width of said duct but not less than one-quarter of said width.

3. An elbow for a rectangular cross section fluid duct, an angled bend at the inner corner of the exterior of said elbow, the interior of said elbow having curved surfaces at said inner bend and at the outer corner thereof, said first mentioned curved surface having an angle of curvature greater than the angle of said elbow and a radius of curvature in the direction of the bend of said elbow of the order of one-half the width of said duct, said second curved surface having a radius of curvature of the order of one and one-third times the width of said duct.

4. In a rectangular cross section fluid duct, an elbow for joining two duct sections which are respectively positioned closely against two surfaces which meet at a right angle, said elbow being fitted around said right angle but having a minimum radius on the inner surface at the inner corner thereof not greater than the width of said duct but not less than one-quarter of said width, the angle of the arc of said curvature being greater than the angle of said elbow.

5. An elbow for a rectangular cross section fluid duct having an angled bend at the inner corner of said elbow, the interior of said elbow having a superimposed cylindrical surface at said inner corner having a minimum radius of curvature in the direction of the bend of said elbow not greater than the width of said duct but not less than one-quarter of said width, the angle of the arc of said curvature being greater than the angle of said elbow.

ANTHONY C. SICILIANO.

REFERENCES CITED

The following references are of record in the file of this patent:

UNITED STATES PATENTS

| Number | Name | Date |
| --- | --- | --- |
| 562,957 | Goff | June 30, 1896 |
| 1,984,172 | Brownley | Dec. 11, 1934 |
| 2,147,431 | Ewing | Feb. 14, 1939 |
| 2,216,046 | Peck | Sept. 24, 1940 |
| 2,273,818 | Childers et al. | Feb. 24, 1942 |
| 2,359,579 | Peck | Oct. 3, 1944 |